United States Patent [19]
Yumoto

[11] Patent Number: 5,624,298
[45] Date of Patent: Apr. 29, 1997

[54] JIG FOR HEADPIECE AGGREGATE MACHINING AND METHOD FOR MANUFACTURING A THIN FILM MAGNETIC HEAD

[75] Inventor: Kenji Yumoto, Miyota-machi, Japan

[73] Assignee: TDK Corporation, Tokyo, Japan

[21] Appl. No.: 417,769

[22] Filed: Apr. 6, 1995

[51] Int. Cl.$^6$ .................................................. B24B 1/00
[52] U.S. Cl. ................................................ 451/28; 451/5
[58] Field of Search .......................... 451/55, 1, 5, 114, 451/364, 28; 269/73, 246

[56] References Cited

U.S. PATENT DOCUMENTS

| | | | |
|---|---|---|---|
| 4,689,877 | 9/1987 | Church | 451/1 |
| 4,841,625 | 6/1989 | Valstyn | 451/1 |
| 4,861,398 | 8/1989 | Fukuoka et al. | 451/1 |
| 4,912,883 | 4/1990 | Chang et al. | 451/1 |
| 4,914,868 | 4/1990 | Church et al. | 451/11 |
| 5,117,589 | 6/1992 | Bischoff et al. | 451/387 |
| 5,203,119 | 4/1993 | Cole | 451/5 |
| 5,214,589 | 5/1993 | Tang | 451/1 |

FOREIGN PATENT DOCUMENTS

| | | |
|---|---|---|
| 62-95716 | 5/1987 | Japan. |
| 63-113818 | 5/1988 | Japan. |
| 1-153264 | 6/1989 | Japan. |
| 1-153265 | 6/1989 | Japan. |
| 2-71415 | 3/1990 | Japan. |
| 3-245967 | 11/1991 | Japan. |
| 4-291010 | 10/1992 | Japan. |

*Primary Examiner*—James G. Smith
*Assistant Examiner*—Derris H. Banks
*Attorney, Agent, or Firm*—Oblon, Spivak, McClelland, Maier & Neustadt, P.C.

[57] ABSTRACT

A jig used for machining a head piece aggregate includes a first jig member and a second jig member. The first jig member is provided with a mounting surface to which the head piece aggregate is bonded, and the second jig member includes a main body portion and a distortion-generating mechanism. The main body portion is linked to the first jig member so that the distortion-generating mechanism, provided at the main body portion, imparts distortion to the first jig member. Thus, distortion of the head piece aggregate that occurs after it is secured on to the jig can be corrected.

7 Claims, 8 Drawing Sheets

JIG FOR HEADPIECE AGGREGATE MACHINING AND METHOD FOR MANUFACTURING A THIN FILM MAGNETIC HEAD

BACKGROUND OF THE INVENTION

1. Field of the Invention

The present invention relates to a jig for headpiece aggregate machining and a method for manufacturing a thin-film magnetic head.

2. Discussion of Background

A thin-film magnetic head is manufactured through processes in which a plurality of thin-film magnetic head elements are arrayed in a lattice-like pattern on a wafer constituted of a ceramic substrate. A row-like head piece aggregate is taken out of the wafer and the row-like head piece aggregate thus taken out is bonded to a jig with adhesive and then lapped. One of the main objects of the lapping process is to set the throat height (gap depth), which greatly affects the electromagnetic characteristics. A thin-film magnetic head is provided with pole pieces facing opposite each other across a gap film, and yoke portions that are continuous with the pole pieces. One of the pole pieces is provided with a displacement area that rises in a direction that separates it from the surface of the ceramic substrate, which is located behind the front end area, which is formed in such a manner that it lies practically parallel to the surface of the ceramic substrate. The pole piece is continuous with the yoke portion via the displacement area. The depth of the pole pieces from the front end to the displacement point is normally referred to as the throat height or the gap depth. The throat height is a micro dimension of, for instance, approximately 1 μm and it plays an extremely important role in determining the electromagnetic characteristics. In setting the throat height, a row-like head piece aggregate that has been cut out from the wafer is bonded with adhesive to a jig constituted of iron, stainless steel or the like, and in this state, the end surface where the pole piece emerges is lapped to a specific point in order to attain a specific throat height for the row-like head piece aggregate. Lapping technologies of the known art for a head piece aggregate are disclosed in Japanese Unexamined Patent Publication (Kokai) No. 95716/1987 and Japanese Unexamined Patent Publication (Kokai) No. 113818/1988.

However, since the coefficients of thermal expansion differ between the head piece aggregate, which is constituted of a ceramic structure, and a jig, which is constituted of iron, stainless steel or the like, distortions are generated in the head piece aggregate due to this difference in the coefficients of thermal expansion, causing a bow or bend in the head piece aggregate. A bow or bend in a head piece aggregate is also caused by hardening contraction of the adhesive used for attaching the head piece aggregate to the jig. This makes it difficult, during the lapping process and the like, to perform lapping in such a manner that the throat heights of the various electromagnetic elements arrayed on the head piece aggregate are the same.

Attempts to solve the problem discussed above have already been made. For instance, Japanese Unexamined Patent Publication (Kokai) No. 71415/1990 discloses a technology with which the throat height is controlled precisely by constituting the upper portion and the lower portion of the lap carrier to which the head piece aggregate is temporarily bonded, with materials whose coefficients of thermal expansion are different from each other, temporarily bonding the head piece aggregate and the lap carrier with a thermally soluble adhesive and by ensuring that during this temporary bonding, the lap carrier surface that comes in contact with the head piece aggregate becomes bowed when heated and that the lap carrier surface regains its flatness when cooled. Also, Japanese Unexamined Patent Publication (Kokai) No. 291010/1992 discloses a technology with which thin-film magnetic heads with consistent throat height accuracy can be obtained by controlling the machining distortions on the front surface (floating surface) and the rear surface of the head piece aggregate by means of deforming the head piece aggregate in such a manner that the distortion in the front surface and in the rear surface of the head piece aggregate cancel each other out, or by a means of lapping with differing degrees of machining distortion.

However, none of the technologies in the prior art disclose a means for correcting distortions of the head piece aggregate which occur after it is secured on to the jig.

SUMMARY OF THE INVENTION

It is an object of the present invention to provide a jig for head piece aggregate machining and a method for manufacturing a thin-film magnetic head in which inconsistencies in the throat height caused by bows and bends in the head piece aggregate can be prevented.

It is a further object of the present invention to provide a jig for head piece aggregate machining and a method for manufacturing a thin-film magnetic head in which distortions of a head piece aggregate which occur after it is secured, can be corrected.

In order to achieve the objects described above, the jig for head piece aggregate machining according to the present invention is provided with a first jig member and a second jig member. The first jig member is provided with a mounting surface to which the head piece aggregate is bonded. The second jig member includes a main body portion and a means for generating distortion. The main body portion is linked with the first jig member, and the means for generating distortion provided at the main body portion causes distortion of the first jig member.

As mentioned above, the first jig member is provided with a mounting surface to which the head piece aggregate is bonded. Consequently, the head piece aggregate can be lapped while it is bonded to the mounting surface of the first jig member.

The second jig member includes a main body portion and a means for generating distortion. The main body portion is linked with the first jig member, and the means for generating distortion is provided at the main body portion and causes distortion of the first jig member. Because of this, the head piece aggregate which is bonded to the first jig member also becomes distorted in response to the distortion of the first jig member. This distortion of the head piece aggregate serves to correct distortion that occurs after it is secured on to the first jig member. It is preferable that the aforementioned means for generating distortion should be capable of generating both positive and negative distortion relative to the mounting surface.

The jig may take a structure in which the means for generating distortion includes a moving member and a drive member. The moving member is mounted on the main body portion in such a manner that it can move and the drive member is mounted at the main body portion so that it causes the moving member to move in response to an operation from the outside. Thus, distortion of the head piece aggregate which occurs after it is secured on the jig can be corrected with a simple structure.

The jig may also take a structure in which the first jig member is provided with a hole that opens into at least one surface which is in contact with the second jig member so that a projection on the moving member provided at the second jig member can be inserted into the hole. This connection between the first and second jig member constitutes a simple structure.

The jig may also take a structure in which the drive member includes a threaded portion, one end of which is linked with the moving member, the middle section which is threaded through the main body portion and the other end of which is led out to the outside of the main body portion. By adopting this structure, it is possible to correct distortion of the head piece aggregate that occurs after it is secured on to the jig. Specifically, a rotating force is applied to the other end of the threaded body that is led out to the outside, and since the threaded body and the second jig member are connected by the threading, a linear motion is imparted to the threaded body in the direction of the shaft to advance or withdraw the moving body, which, in turn, causes distortion of the first jig member. Thus, the distortion correcting operation is simplified.

The jig may also take a structure in which pins are provided which are positioned between the first and the second jig members to ensure positioning of the members. With this structure, it is possible to position the first jig member and the second jig member at specific positions simply and reliably.

The method for manufacturing a thin-film magnetic head according to the present invention includes a process for machining a head piece aggregate and this process for head piece aggregate machining uses the jig according to the present invention in any one of the structures described above. By using the method for manufacturing a thin-film magnetic head according to the present invention, distortion of the head piece aggregate that occurs after it is secured to the jig can be corrected simply and reliably.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
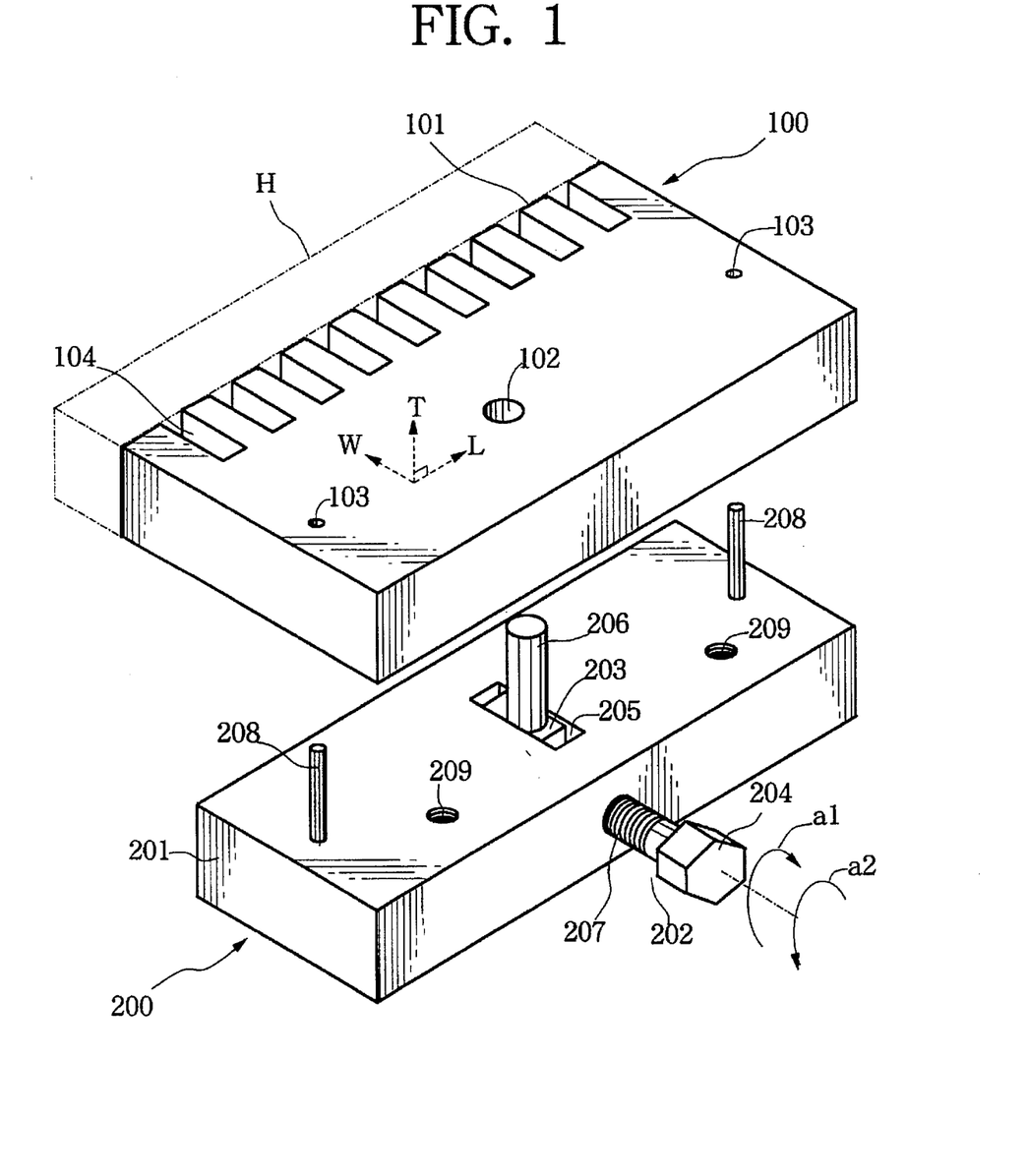
FIG. 1 is an exploded perspective view of the jig for head piece aggregated machining according to the present invention.
Figure 2:
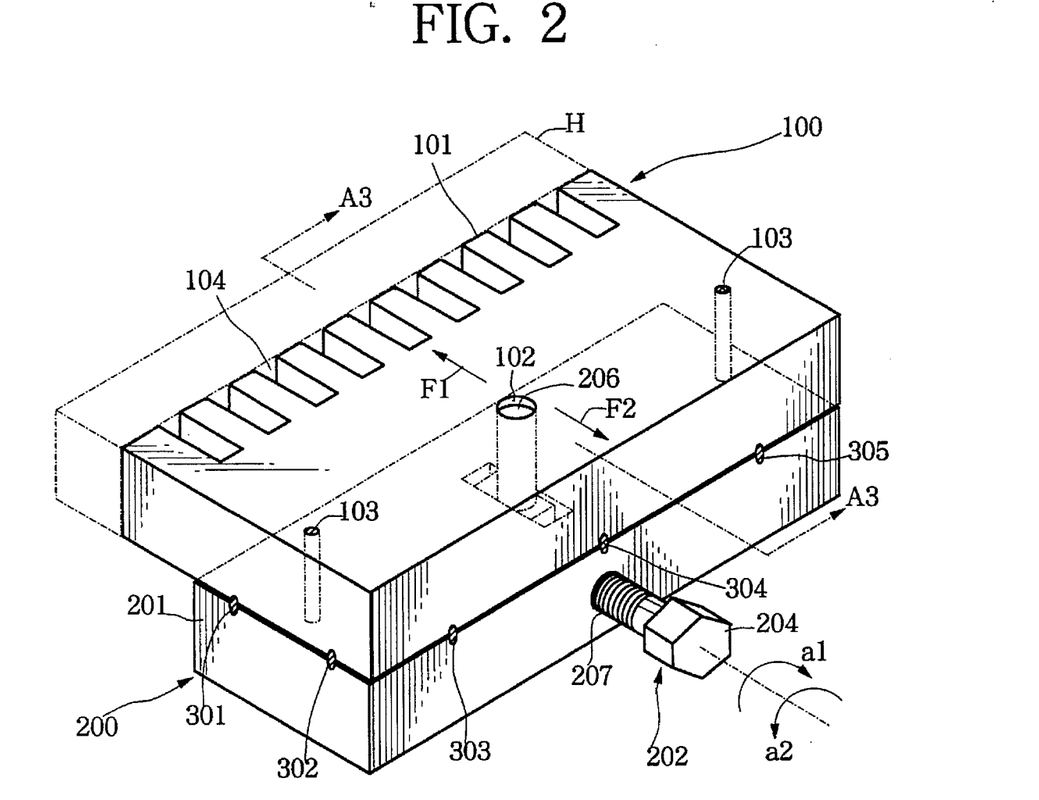
FIG. 2 is a perspective view of the jig for head piece aggregate machining shown in FIG. 1 in use.
Figure 3:
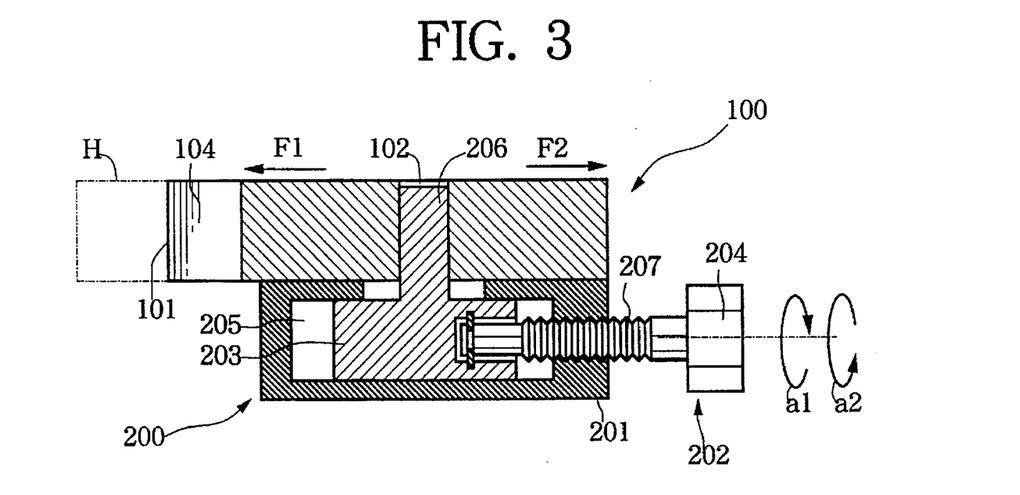
FIG. 3 is a cross section of FIG. 2 through line A3—A3.

As shown in FIGS. 1 to 3, the jig for head piece aggregate machining according to the present invention is provided with a first jig member 100 and a second jig member 200. The first jig member 100 and the second jig member 200 are constituted of iron, stainless steel or the like. A head piece aggregate H is formed in a bar-like shape with thin-film magnetic head elements arrayed in a row-or in a plurality of columns in one direction. The method for manufacturing the head piece aggregate H and its structure are of the known art, details of which are to be given later.

The first jig member 100 is provided with a mounting surface 101, to which the head piece aggregate H is bonded.

The second jig member 200 includes a main body portion 201 and a means for generating distortion 202. The main body portion 201 is linked with the first jig member 100 and the means for generating distortion 202, provided at the main body portion 201, causes distortion F1 or F2 of the first jig member 100.

As explained above, since the first jig member is provided with a mounting surface 101 to which the head piece aggregate H may be bonded, the bar-shaped head piece aggregate H is first bonded to the mounting surface 101 of the first jig member 100 and, in this state, the head piece aggregate can be assigned to the lapping process and the like. When bonding the head piece aggregate H, an adhesive of the known art, such as an instantaneous glue, can be used. At this point, since there is a difference in the coefficients of thermal expansion between the head piece aggregate H constituted of a ceramic structure and the first jig member 100, constituted of iron, stainless steel or the like, distortion may occur in the head piece aggregate H due to this difference in the coefficient of thermal expansion, resulting in a bow or a bend in the head piece aggregate H. The head piece aggregate H may also become bowed or bent due to contraction of the adhesive used for bonding the head piece aggregate H to the first jig member 100, during hardening.

The second jig member 200 includes a main body portion 201 and a means for generating distortion 202. The main body portion 201 is linked with the first jig member 100, and the means for generating distortion 202 is provided at the main body portion 201 and causes distortion F1 or F2 of the first jig member 100. Because of this, the head piece aggregate H which is bonded to the first jig member 100 also becomes distorted in response to the distortion F1 or F2 of the first jig member 100. This corrects the distortion of the head piece aggregate H which occurs after it is secured on to the jig.

Preferably, the means for generating distortion 202 should be capable of generating a positive distortion F1 or a negative distortion F2, relative to the mounting surface 101 so that a distortion of the head piece aggregate H in either direction can be corrected.

The mounting surface 101 of the first jig member 100 shown in the figures is positioned on one side in the direction W of the width and one mating surface of the main body portion 201 of the second jig member 200 is in mating surface contact with one mating surface of the first jig member 100 in the direction T of its thickness when the direction W of the width and the direction L of the length are hypothetically set on one surface. This places the first jig member 100 and the second jig member 200 in a stable surface-coupling via the mating surfaces in the direction T of the thickness and a jig is thereby achieved which generates a distortion F1 or F2 to the mounting surface 101 provided on a side surface in the direction W of the width which lies at a right angle to the mounting surface in the direction T of the thickness, is in the plane of the mating surfaces.

The means for generating distortion 202 preferably includes a moving member 203 and a drive member 204. The moving member 203 is mounted on the main body portion 201 in such a manner that it can move and the drive member 204 is mounted on the main body portion 201 so that it causes the moving member 203 to move in response to an operation from the outside. Thus, distortion of the head piece aggregate H which occurs after it is secured on the first jig member 100 can be corrected with a simple structure. The moving member 203 is housed in a guide groove 205 provided in the second jig member 200 and it moves within this guide groove 205.

The first jig member 100 is provided with a hole 102 that opens into at least one surface of the second jig member 200. The moving member 203 has a projection 206 that is inserted in the hole. In this structure, the connection between the first jig member 100 and the second jig member 200 is simple.

To provide further detail, the drive member 204, one end of which is linked with the moving member 203 and the other end of which is led out to the outside of the main body portion 201, includes a threaded portion 207 in its middle section that is threaded into the main body portion 201. By adopting this structure, it is possible to correct distortion of the head piece aggregate H that occurs after it is secured on to the jig by applying a rotating force in the direction indicated with either the arrow a1 or a2 to the other end of the threaded body 207 that is led out to the outside. Because it is threaded into the second jig member 200, this rotation results in a linear motion being imparted to the threaded body 207 in the direction of the shaft to advance or withdraw the moving member 203, which, in turn, causes distortion of the first jig member 100. This simplifies the distortion correcting operation.

Furthermore, the jig shown in the embodiment includes pins 208 which are fitted between the first jig member 100 and the second jig member 200 to ensure positioning of the members. With this structure, it is possible to position the first jig member 100 and the second jig member 200 at specific positions simply and reliably. The figures show a structure in which the pins 208 are inserted in the holes 103 in the first jig member 100. It would be equally feasible to provide the pins 208 in the first jig member 100 to fit into holes in the second jig member 200.

The first jig member 100 and the second jig member 200 are linked as one with spots of adhesive 301 to 305 (see FIG. 2) which are applied between the two members. One or more of the pins 208 and holes 103, and the spots of adhesive 301–305 thus constitute means, for positioning the first jig member on the second jig member so that the first jig member can distort in the plane of the mating surfaces. The spots of adhesive 301 to 305 should be constituted of instantaneous glue. The second jig member 200 is provided with separating holes 209 so that it can be separated from the first jig member 100 regardless of the bonding between them. The two members are separated from each other with screws or the like threaded through the separating hole 209 from the lower surface of the second jig member 200 to push up the first jig member 100. In addition, the first jig member 100 is provided with grooves 104 which will provide an escape zone for the cutting blade when individual magnetic head elements are cut from the row-like head piece aggregate H.

The method for manufacturing a thin-film magnetic head according to the present invention includes a process for machining the head piece aggregate which requires the use of the jig according to the present invention in any one of the structures described above. The method for manufacturing the head piece aggregate and the structure thereof are of the known art. One example is shown in FIGS. 4 to 8.

Figure 4:
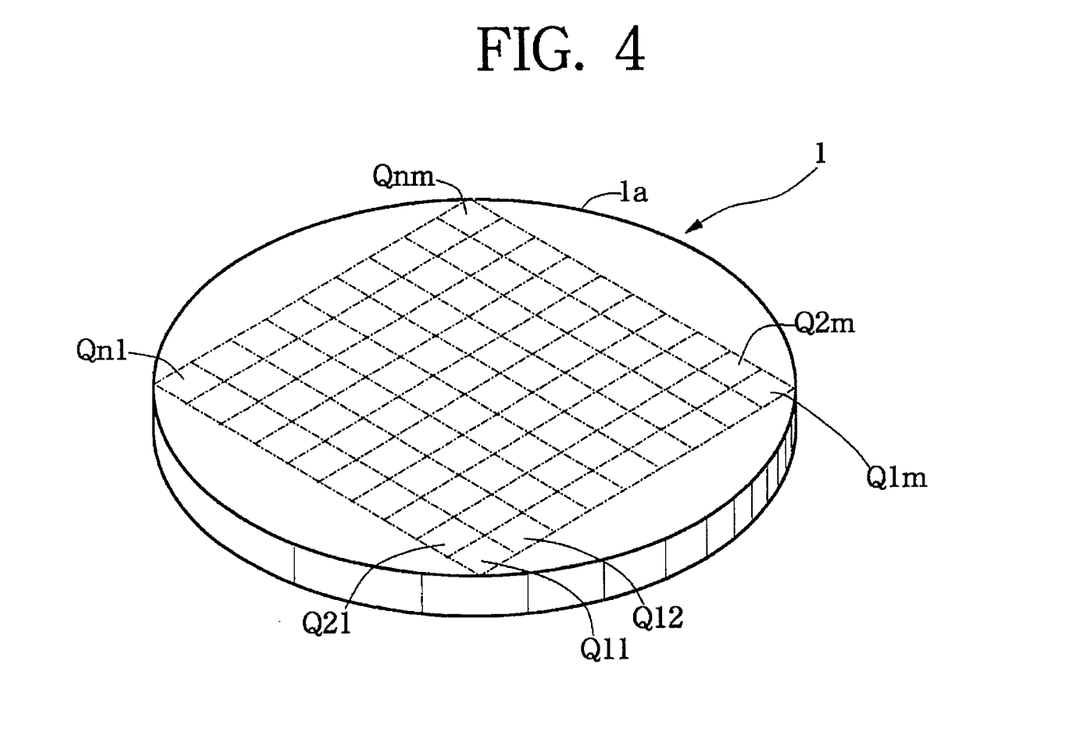
FIG. 4 is a process included in the method for manufacturing a thin-film magnetic head according to the present invention.

First, as shown in FIG. 4, a wafer 1 is provided with thin-film magnetic head elements Q11 to Qnm arrayed in a lattice-like pattern on a base body 1a. The thin-film magnetic head elements Q11 to Qnm are normally formed on the wafer 1 in such a manner that their area of formation is quadrangular.

In the next step, the head piece aggregate H, which includes the thin-film magnetic head elements Q11 to Qnm, is taken out by cutting. This step is normally performed, as shown in FIG. 5, by first cutting away the arc portions (ears) formed on the outside of the area where the thin-film magnetic head elements Q11 to Qnm are formed on the wafer 1, to obtain a quadrangular wafer 1, and then by cutting the head piece aggregate H away from the quadrangular wafer 1, as shown in FIG. 6.

Figure 5:
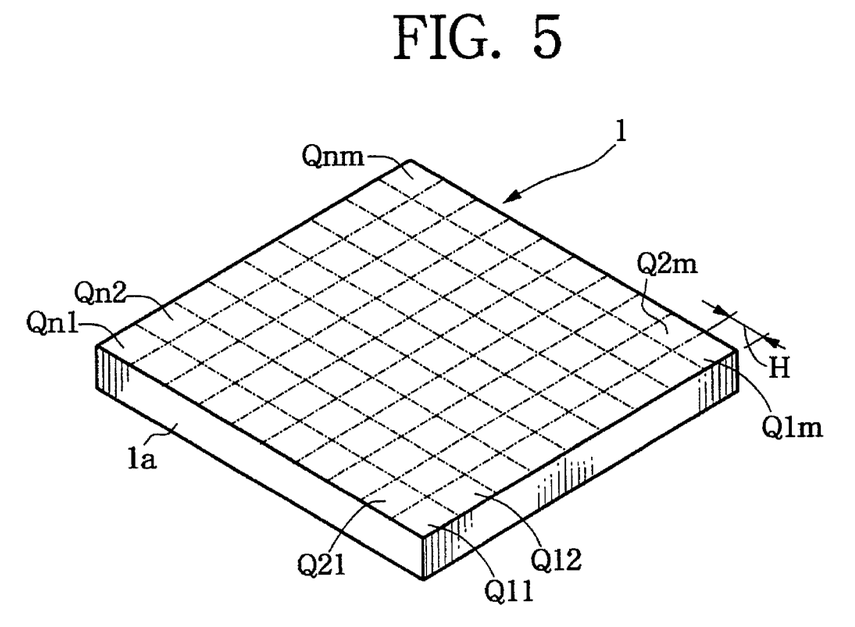
FIG. 5 shows another process included in the method for manufacturing a thin-film magnetic head according to the present invention.
Figure 6:
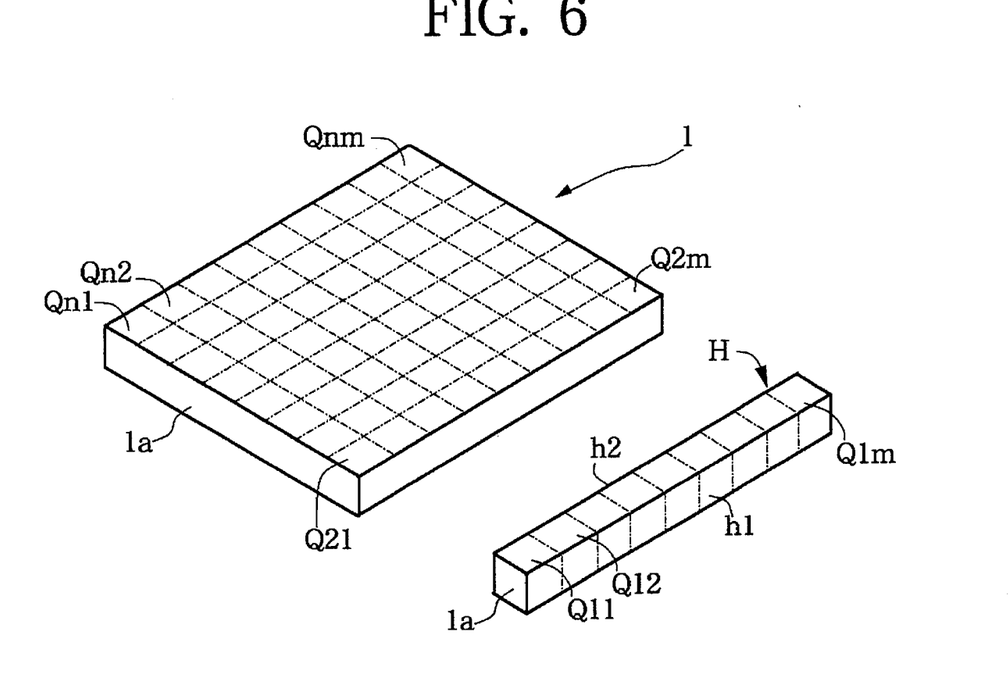
FIG. 6 shows a process included in the method for manufacturing a thin-film magnetic head according to the present invention.
Figure 7:
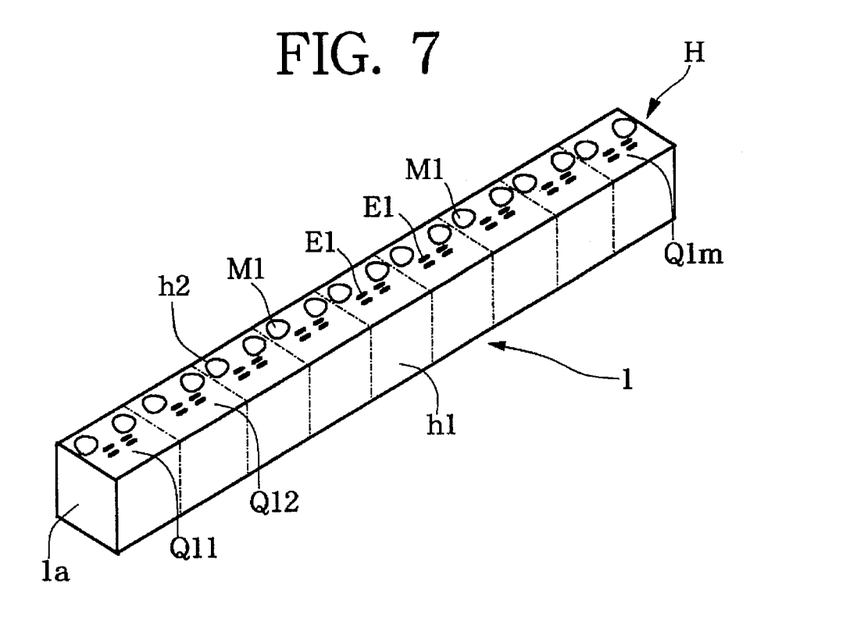
FIG. 7 shows a process included in the method for manufacturing a thin-film magnetic head according to the present invention.
Figure 8:
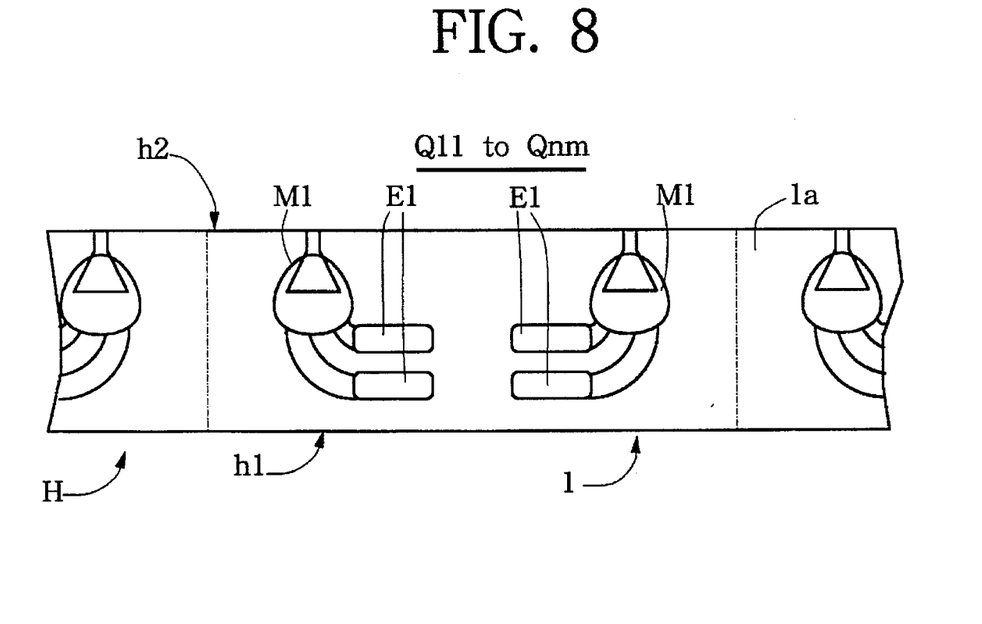
FIG. 8 is a partial enlargement of a head piece aggregate.

FIGS. 7 and 8 show the head piece aggregate H which has been taken out through the steps shown in FIGS. 4 to 6. As shown in FIGS. 7 and 8, the thin-film magnetic head elements Q11 to Q1m of the head piece aggregate H have the same directional orientation on a given cut surface h1 or h2. E1 are take out electrodes and they are electrically continuous with the thin-film electromagnetic elements M1.

The wafer 1 is constituted of a ceramic structure of, for instance, $Al_2O_3$—TiC or the like. The thin-film magnetic head elements Q11 to Qnm are formed on one surface of the wafer 1 on top of an insulating film such as $Al_2O_3$.

Figure 9:
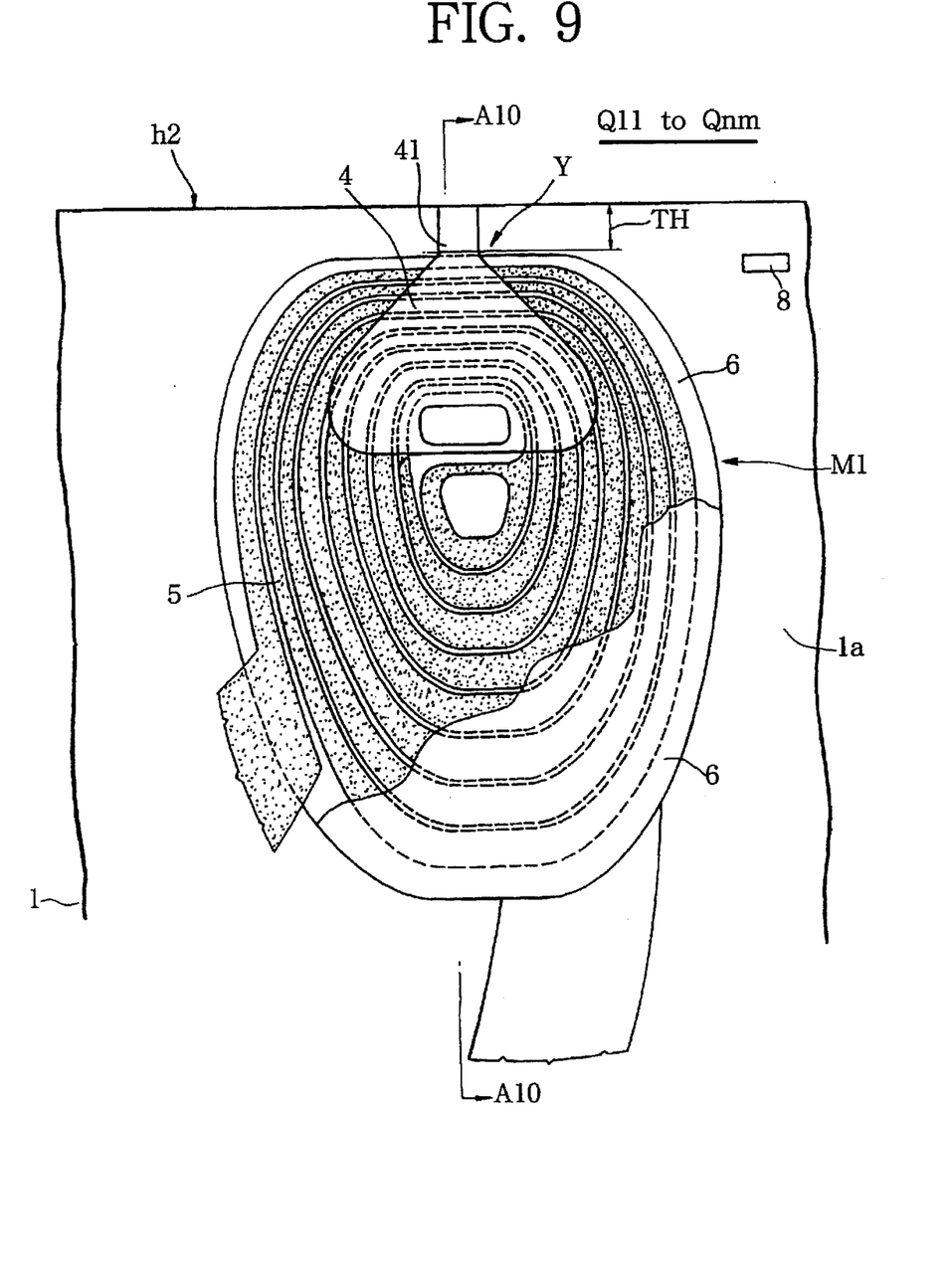
FIG. 9 is an enlarged plan view of a partial cut away cross section of a thin-film magnetic head element.
Figure 10:
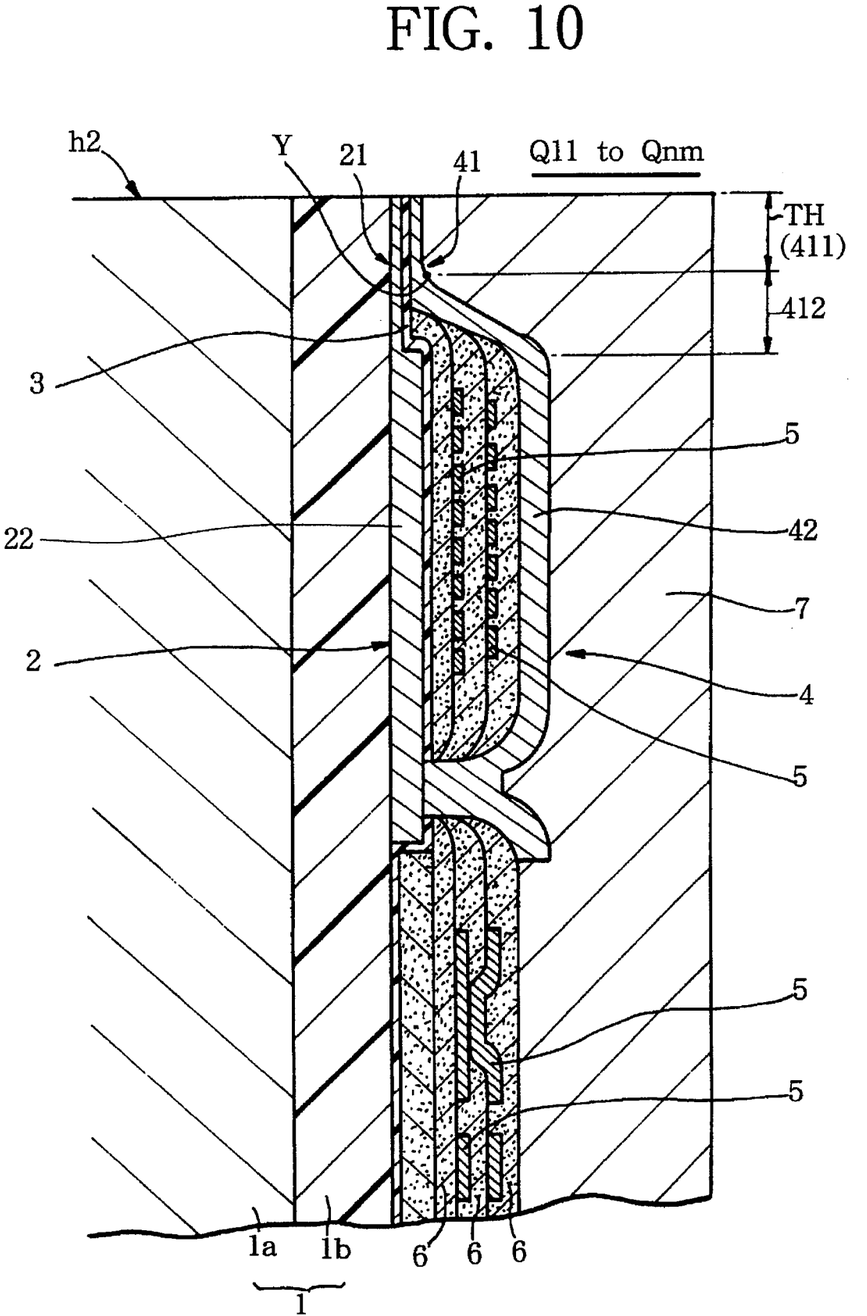
FIG. 10 is a cross section of FIG. 9 through line A10—A10.

The thin-film magnetic head elements Q11 to Qnm are formed through high precision pattern-forming technology, the main element of which being photo lithography similar to that used in IC manufacturing technology. FIG. 9 is an enlarged partial cut-away plan view of one of the thin-film magnetic head elements Q11 to Qnm and FIG. 10 is a cross section through line A10—A10 in FIG. 10. FIGS. 9 and 10 are shown on different scales. As shown in FIG. 9, each thin-film magnetic head element Q11 to Qnm is provided with thin-film electromagnetic elements M1. While the thin-film magnetic head element in the figures is provided with two thin-film electromagnetic elements M1, it may be provided with only one, or three or more thin-film electromagnetic elements M1.

Next, as shown in FIGS. 9 and 10, the wafer 1 is provided with an $Al_2O_3$ insulating film 1b covering the surface of the base body 1a which is constituted of $Al_2O_3$—TiC and the thin-film electromagnetic elements M1 are formed over the insulating film 1b. The thin-film electromagnetic elements M1 have a thin-film laminated structure constituted with a lower magnetic film 2, a gap film 3, an upper magnetic film 4, a coil film 5 and a layer insulating film 6. The entire structure is covered with a protective film 7 which is constituted of $Al_2O_3$ or the like.

The lower magnetic film 2 and the upper magnetic film 4 are provided with pole pieces 21 and 41 respectively which face opposite each other across the gap film 3 and are also provided with yolk portions 22 and 42 which continue from the pole pieces 21 and 41 respectively. The pole piece 41 of the upper magnetic film 4 incorporates a displacement area 412 which rises in a direction which separates it from the surface of the wafer 1, located behind the front end area 411, which is formed in such a manner that it lies practically parallel to the surface of the wafer 1, which is a ceramic structure. The pole piece 41 is contiguous with the yolk portion 42 via the displacement area 412. The depth of the pole piece from the front end to the displacement start point Y is referred to as the throat height TH. The yolk portions 22 and 42 are linked in the rear area so that they complete a magnetic circuit.

Each of the thin-film magnetic head elements Q11 to Qnm is provided with a machining mark 8 as shown in FIG. 9. The machining mark 8 is made in such a manner that it has a specific positional relationship with the displacement start point Y, which is used as a reference for determining the throat height TH in each of the thin-film magnetic head elements Q11 to Qnm.

One surface h1 of the two cut surfaces h1 and h2 of the head piece aggregate H thus obtained, is attached to the first jig member 100 using an instantaneous glue or the like, as shown in FIGS. 1, 2 and 3. It is advisable to measure the straightness of the head piece aggregate H after it is attached.

Next, the first jig member 100 is set on to the second jig member 200 and the means for generating distortion is operated. The direction in which the distortion generating mechanism is adjusted should be the direction in which the pre-correction TH curve is corrected.

Figure 11:
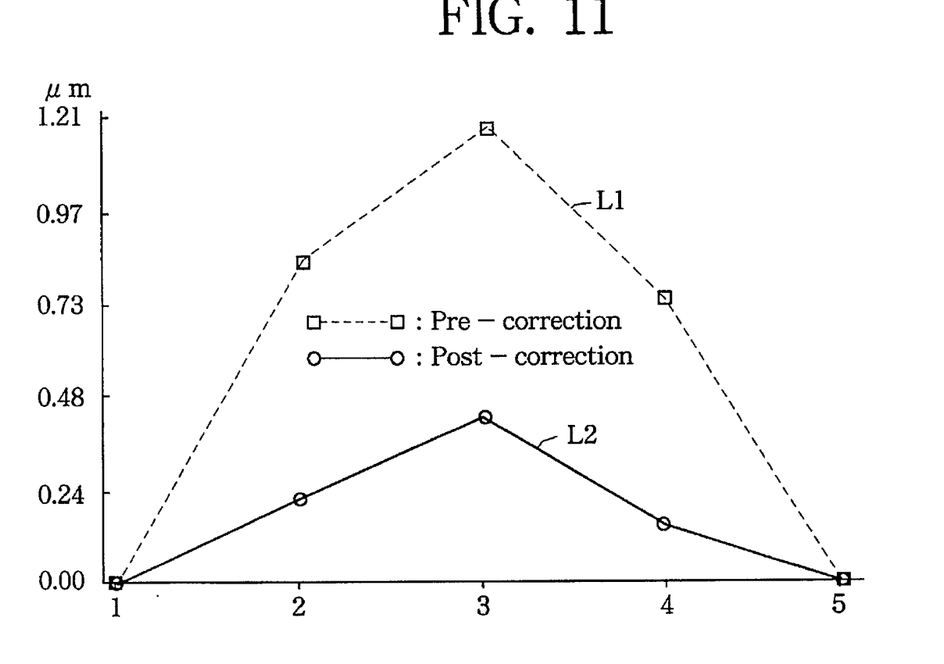
FIG. 11 shows data from actual measurements as the pre-correction TH curve and the post-correction TH curve.
Figure 12:
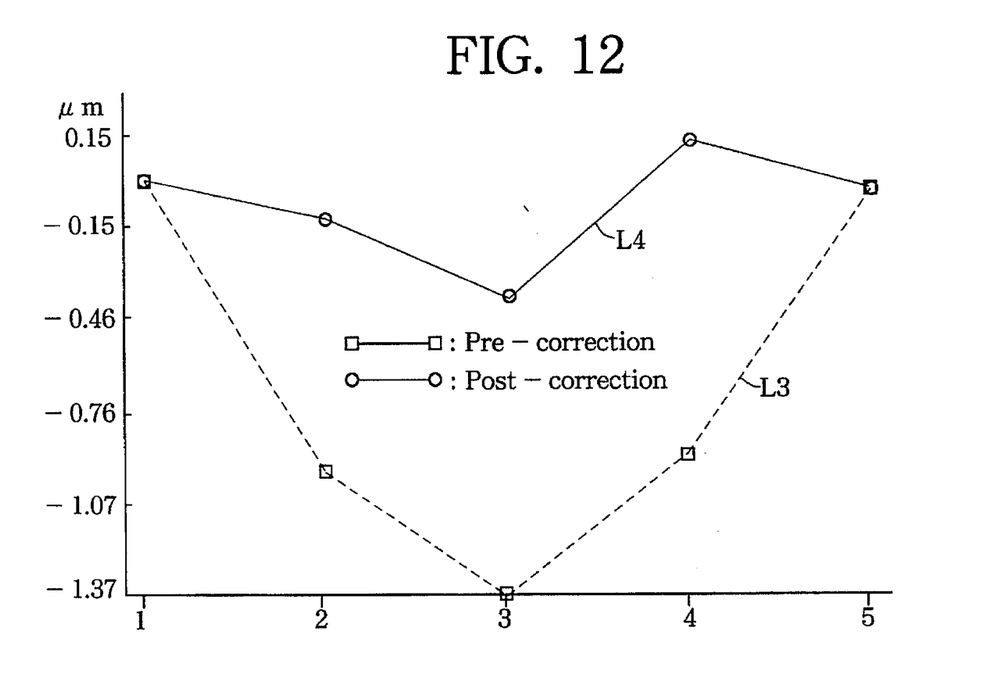
FIG. 12 shows data from actual measurements as the pre-correction TH curve and the post-correction TH curve.

FIGS. 11 and 12 show data from actual measurements of pre-correction TH curves and post-correction TH curves. The curves L1 and L3 indicate the pre-correction TH curve characteristics and the curves L2 and L4 indicate the post-correction TH curve characteristics. As is clear from comparing them, with the jig according to the present invention, the TH curves can be greatly improved.

Then, the first jig member 100 and the second jig member 200 are fixed by applying the adhesives 301 to 305 (see FIG. 2) which may be an instantaneous glue or the like, between them. Ensure that the adhesives 301 to 305 are applied evenly in small quantities.

Next, verify that the TH curve is made consistent over the entire length of the head piece aggregate by re-measuring the straightness of the head piece aggregate.

Now, the other surface h2 which faces opposite the mounting surface h1 is lapped. Grinding may also be performed during this lapping step. Lapping of the head piece aggregate H can be performed by employing the technology disclosed in Japanese Unexamined Patent Publications (Kokai) No. 153264/1989 and No. 153265/1989. The lapping machine described in these publications includes a rotating body which is structured by bonding the surface of a supporting member formed in a disk shape of a metal material such as stainless steel with the back surface of a lapping member that is formed in a disk shape of a soft metal material such as tin, with an adhesive, to form a unit. The supporting member is provided to support the lapping member, which does not have sufficient mechanical strength. When lapping is performed, the rotating body is rotated on a plane and while an abrasive, which includes diamond particles or the like, is supplied to the surface of the lapping member, the surface of the head piece aggregate H that is to be lapped is placed in contact with the surface of the lapping member. The jig is moved parallel to the surface of the lapping member in the direction of the radius of rotation so that lapping can be performed using the entire surface of the lapping member. Auto rotation is added to the jig and the head piece aggregate H.

While the head piece aggregate H shown in the figures is provided with only one column of magnetic head elements, it may be provided with two or more columns of magnetic head elements. Also, the embodiment presents an example which includes two thin-film magnetic head elements provided on each magnetic head element, but it may be provided with only one thin-film magnetic head element. The present invention may be applied to the type which is provided with a rail on the side toward the surface that faces opposite the medium and also the type which is not provided with a rail. In addition, it can be applied to a thin-film magnetic head that includes induction type electromagnetic elements and magnetic resistance effect elements.

While the invention has been particularly shown and described with reference to preferred embodiment thereof, it will be understood by those skilled in the art that various changes in form and detail may be made therein without departing from the spirit, scope and teaching of the invention.

What is claimed is:

1. A jig for head piece aggregate machining, comprising:

a first jig member having a mounting surface to which a head piece aggregate may be mounted;

a second jig member having a mating surface with which a mating surface said first jig member mates so that said second jig member can move on said first jig member in a direction parallel to said mating surfaces;

means for positioning said first jig member on said second jig member such that said first jig member can distort in a plane extending parallel to said mating surfaces and substantially perpendicular to the length of said mounting surface while said mating surfaces remain mated; and means in said second jig member for distorting said first jig member in the plane extending parallel to said mating surfaces and substantially perpendicular to the length of said mounting surface.

2. A jig for head piece aggregate machining according to claim 1 wherein:

said means for distorting generate positive and negative distortion relative to said mounting surface.

3. A jig for head piece aggregate machining according to claim 1 wherein:

said means for distorting includes a moving member and a drive member, said moving member being movably mounted to said second jig member, and said drive member being mounted on said second jig member so as to impart movement to said moving member.

4. A jig for head piece aggregate machining according to claim 3 wherein said means for distorting include:

a hole at said mating surface of said first jig member, and a projection on said second jig member and inserted into said hole.

5. A jig for head piece aggregate machining according to claim 3 wherein;

said drive member, one end of which is linked with said moving member, and the other end of which is led outside of said second jig member, includes a threaded portion at a middle section which is threaded into said second jig member.

6. A method for manufacturing a thin-film magnetic head which includes:

a process for machining a head piece aggregate wherein;

a jig according to any of claims 2 to 3 is employed for head piece aggregate machining.

7. A jig for head piece aggregate machining according to claim 1 wherein said means for positioning comprise pins fitted between said first jig member and said second jig member.

* * * * *